United States Patent
Chang et al.

(10) Patent No.: US 10,193,731 B2
(45) Date of Patent: Jan. 29, 2019

(54) METHOD AND APPARATUS FOR GENERATING SYNCHRONIZATION SIGNAL IN INTERNET OF THINGS

(71) Applicant: ELECTRONICS AND TELECOMMUNICATIONS RESEARCH INSTITUTE, Daejeon (KR)

(72) Inventors: Kapseok Chang, Daejeon (KR); Moon-Sik Lee, Daejeon (KR); Ohyun Jo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 35 days.

(21) Appl. No.: 15/480,485

(22) Filed: Apr. 6, 2017

(65) Prior Publication Data
US 2017/0295050 A1    Oct. 12, 2017

(30) Foreign Application Priority Data

Apr. 8, 2016 (KR) .......... 10-2016-0043482
Mar. 16, 2017 (KR) .......... 10-2017-0033339

(51) Int. Cl.
| | | |
|---|---|---|
| *H04L 27/26* | (2006.01) | |
| *H04L 5/00* | (2006.01) | |
| *H04L 7/00* | (2006.01) | |
| *H04L 29/08* | (2006.01) | |
| *H04J 13/00* | (2011.01) | |

(52) U.S. Cl.
CPC ...... *H04L 27/2628* (2013.01); *H04J 13/0062* (2013.01); *H04L 5/0053* (2013.01); *H04L 67/12* (2013.01); *H04L 5/0007* (2013.01); *H04L 27/2607* (2013.01)

(58) Field of Classification Search
CPC .... H04L 27/2628; H04L 67/12; H04L 7/0008
See application file for complete search history.

(56) References Cited

U.S. PATENT DOCUMENTS

| | | | |
|---|---|---|---|
| 8,503,878 B2* | 8/2013 | Wang ........... | H04J 14/0298 370/216 |
| 2010/0005132 A1* | 1/2010 | Choi ............. | G06F 7/586 708/491 |
| 2010/0104044 A1* | 4/2010 | Kishigami ..... | H04L 27/2614 375/299 |
| 2011/0103506 A1* | 5/2011 | Moon ............ | H04L 5/0023 375/267 |
| 2011/0117943 A1 | 5/2011 | Chun et al. | |

(Continued)

FOREIGN PATENT DOCUMENTS

| | | |
|---|---|---|
| KR | 10-1467570 B1 | 12/2014 |
| KR | 10-2016-0053835 A | 5/2016 |

*Primary Examiner* — Rasheed Gidado
(74) *Attorney, Agent, or Firm* — LRK Patent Law Firm (57) ABSTRACT

A method and an apparatus for generating a synchronization signal in the Internet of things. In the method for generating a synchronization signal, subcarrier mapping may be performed by exchanging a signal allocated to an upper subcarrier group and a signal allocated to a lower subcarrier group among all subcarriers allocated for the synchronization signal with each other, in an in-band operation mode or a guard band operation mode of the Internet of things.

11 Claims, 7 Drawing Sheets

(56) References Cited

U.S. PATENT DOCUMENTS

| | | |
|---|---|---|
| 2012/0219077 A1 | 8/2012 | Chang et al. |
| 2013/0136075 A1* | 5/2013 | Yu .................... H04W 72/0453 |
| | | 370/329 |
| 2016/0095114 A1 | 3/2016 | Kim et al. |
| 2017/0093540 A1* | 3/2017 | Lei ........................ H04L 5/0044 |
| 2017/0237584 A1* | 8/2017 | Yan .................... H04L 25/0224 |
| | | 370/330 |
| 2017/0264406 A1* | 9/2017 | Lei .......................... H04W 4/70 |
| 2017/0265156 A1* | 9/2017 | Xue .................... H04W 56/001 |

* cited by examiner

METHOD AND APPARATUS FOR GENERATING SYNCHRONIZATION SIGNAL IN INTERNET OF THINGS

CROSS-REFERENCE TO RELATED APPLICATION

This application claims priority to and the benefit of Korean Patent Application Nos. 10-2016-0043482 and 10-2017-0033339, filed in the Korean Intellectual Property Office on Apr. 8, 2016 and Mar. 16, 2017, respectively, the entire contents of which are incorporated herein by reference.

BACKGROUND OF THE INVENTION

1. Field of the Invention

The present invention relates to a method and an apparatus for generating a synchronization signal in the Internet of things.

2. Description of Related Art

Wireless communication systems for the Internet of things (IoT) may provide a service to a wide area at a low power and cost using an orthogonal frequency division multiplexing (OFDM) scheme. The wireless communication systems have supported various modes such as a standalone operation mode, an in-band operation mode, a guard band operation mode, and the like, for the purpose of generality. The standalone operation mode indicates a mode of operating a signal for providing an IoT service in a frequency band used in a global system for mobile communication (GSM). The in-band operation mode indicates a mode of operating a signal for providing an IoT service in one or many of available resource blocks (hereinafter, referred to as 'RBs') in a frequency band used in a legacy long term evolution (LTE) system. In addition, the guard band operation mode indicates a mode of operating a signal for providing an IoT service in one or many of unavailable RBs in a frequency band used in a legacy LTE system.

The in-band operation mode and the guard band operation mode may be present in the same frequency band. In addition, as available RBs and unavailable RBs used for an operation, RBs physically positioned at an upper portion (subcarriers having a negative (−) sign) from the center or RBs physically positioned at a lower portion (subcarriers having a positive (+) sign) from the center are used. That is, the in-band operation mode and the guard band operation mode do not use RBs including the center.

Even though the wireless communication systems for the IoT support several operation modes as described above, signals related to synchronization need to be designed to be the same as each other for generality. However, final time-domain synchronization signals received by a receiving apparatus are changed depending on whether or not an operation mode is the in-band/guard band operation mode or the standalone operation mode. Therefore, the receiving apparatus should separately include a memory storing the final time-domain synchronization signal in the in-band/guard band operation mode therein and a memory storing the final time-domain synchronization signal in the standalone operation mode therein, at the time of estimating synchronization.

Meanwhile, the synchronization signals used in the wireless communication systems for the IoT may be generated by mapping specific sequences to each of a frequency domain and a time domain (hereinafter, referred to as 'double-domain sequence mapping'). In the standalone operation mode, signals may be mapped over the frequency domain and the time domain independently of a used frequency band, and thus, there is no problem in generating the synchronization signals by the double-domain sequence mapping. However, in the in-band/guard band operation mode, one or some RBs are used dependently on a frequency band used in a legacy system, and thus, a problem may occur in generating the synchronization signals by the double-domain sequence mapping.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for generating a synchronization signal in the Internet of things having advantages of performing synchronization estimation by a receiving apparatus regardless of a mode.

Further, the present invention has been made in an effort to provide method and an apparatus for generating a synchronization signal in the Internet of things having advantages of enabling double-domain sequence mapping even in an in-band/guard band operation mode.

An exemplary embodiment of the present invention provides a method for generating a synchronization signal in the Internet of things by a transmitting apparatus. The method may include: in an in-band operation mode or a guard band operation mode of the Internet of things, dividing all subcarriers allocated for the synchronization signal into a first upper subcarrier group and a first lower subcarrier group; and performing a first subcarrier mapping by exchanging a signal allocated to the first upper subcarrier group and a signal allocated to the first lower subcarrier group with each other.

The method may further include: in a standalone operation mode of the Internet of things, dividing all subcarriers allocated for the synchronization signal into a second upper subcarrier group and a second lower subcarrier group; and performing a second subcarrier mapping without exchanging the second upper subcarrier group and the second lower subcarrier group with each other.

The method may further include: performing subcarrier indexing on a signal on which the first subcarrier mapping is performed; performing inverse fast Fourier transform (IFFT) on the signal on which the subcarrier indexing is performed; and inserting a cyclic prefix (CP) into the signal on which the IFFT is performed.

The method may further include: performing subcarrier indexing on a signal on which the second subcarrier mapping is performed; performing IFFT on the signal on which the subcarrier indexing is performed; and inserting a CP into the signal on which the IFFT is performed.

The first upper subcarrier group may be included in a physically negative subcarrier group, and the first lower subcarrier group may be included in a physically positive subcarrier group.

The second upper subcarrier group and the second lower subcarrier group may be included in a physically negative subcarrier group.

In the case in which a total number of all subcarriers is 12, indices for the first upper subcarrier group and the second upper subcarrier group may be −1, 0, 1, 2, 3, and 4, respectively, and indices for the first lower subcarrier group and the second lower subcarrier group may be 5, 6, 7, 8, 9, and 10, respectively.

The method may further include: deciding whether or not an operation mode for the Internet of things is the standalone operation mode or the in-band operation mode/the guard band operation mode.

Another exemplary embodiment of the present invention provides a method for generating a synchronization signal in the Internet of things by a transmitting apparatus. The method may include: in an in-band operation mode or a guard band operation mode of the Internet of things, generating a Zadoff-Chu (ZC) sequence; performing code covering on the ZC sequence;

performing subcarrier mapping on a signal on which the code covering is performed; performing IFFT on the signal on which the subcarrier mapping is performed; and inserting a CP into the signal on which the IFFT is performed.

The performing of the subcarrier mapping may include performing the subcarrier mapping by exchanging a signal allocated to an upper subcarrier group and a signal allocated to a lower subcarrier group among all subcarriers allocated for the ZC sequence with each other.

The upper subcarrier group may be included in a physically negative subcarrier group, and the lower subcarrier group may be included in a physically positive subcarrier group.

Yet another exemplary embodiment of the present invention provides a transmitting apparatus transmitting a synchronization signal in the Internet of things. The transmitting apparatus may include: a processor performing a first subcarrier mapping by exchanging a first upper subcarrier group and a first lower subcarrier group among all subcarriers allocated for the synchronization signal with each other to generate the synchronization signal, in an in-band operation mode or a guard band operation mode of the Internet of things; and a radio frequency (RF) module transmitting the generated synchronization signal.

The processor may perform a second subcarrier mapping without exchanging a second upper subcarrier group and a second lower subcarrier group among all subcarriers allocated for the synchronization signal with each other to generate the synchronization signal, in a standalone operation mode of the Internet of things.

The processor may perform subcarrier indexing on a signal on which the first subcarrier mapping is performed, perform IFFT on the signal on which the subcarrier indexing is performed, and insert a CP into the signal on which the IFFT is performed.

The first upper subcarrier group may be included in a physically negative subcarrier group, and the first lower subcarrier group may be included in a physically positive subcarrier group.

The second upper subcarrier group and the second lower subcarrier group may be included in a physically negative subcarrier group.

According to an exemplary embodiment of the present invention, one memory may be used regardless of an operation mode when a receiving apparatus estimates a synchronization signal.

In addition, according to another exemplary embodiment of the present invention, a transmitting apparatus may map double-domain sequences even in the case in which an operation mode is an in-band/guard band operation mode.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, a receiving apparatus may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), and the like, and may include all or some of the functions of the terminal, the MT, the AMS, the HR-MS, the SS, the PSS, the AT, the UE, and the like.

In addition, a transmitting apparatus may indicate a base station (BS), an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like, and may include all or some of the functions of the BS, the ABS, the nodeB, the eNodeB, the AP, the RAS, the BTS, the MMR-BS, the RS, the HR-RS, and the like.

Meanwhile, hereinafter, for convenience of explanation, the number of frequency-domain subcarriers that are allocated to a synchronization signal of the Internet of things is set to 12. However, the number of frequency-domain subcarriers that are allocated to the synchronization signal of the Internet of things may be changed. In addition, a method for generating a synchronization signal to be described below may be performed by a transmitting apparatus.

A synchronization signal according to an exemplary embodiment of the present invention is generated by the following Equation 1. The synchronization signal is generated by a length-11 ZC (Zadoff-Chu) sequence ($d_l(n)$) in a frequency domain as represented by the following Equation 1.

$$d_l(n) = \exp\left(\frac{-j5\pi n(n+1)}{11}\right), n = 0, 1, \ldots, 10.$$ (Equation 1)

In Equation 1, 5 means a root index of a ZC sequence, and l means an orthogonal frequency division multiplexing (OFDM) symbol index. In addition, in Equation 1, $d_l(-1)=0$.

Figure 1:
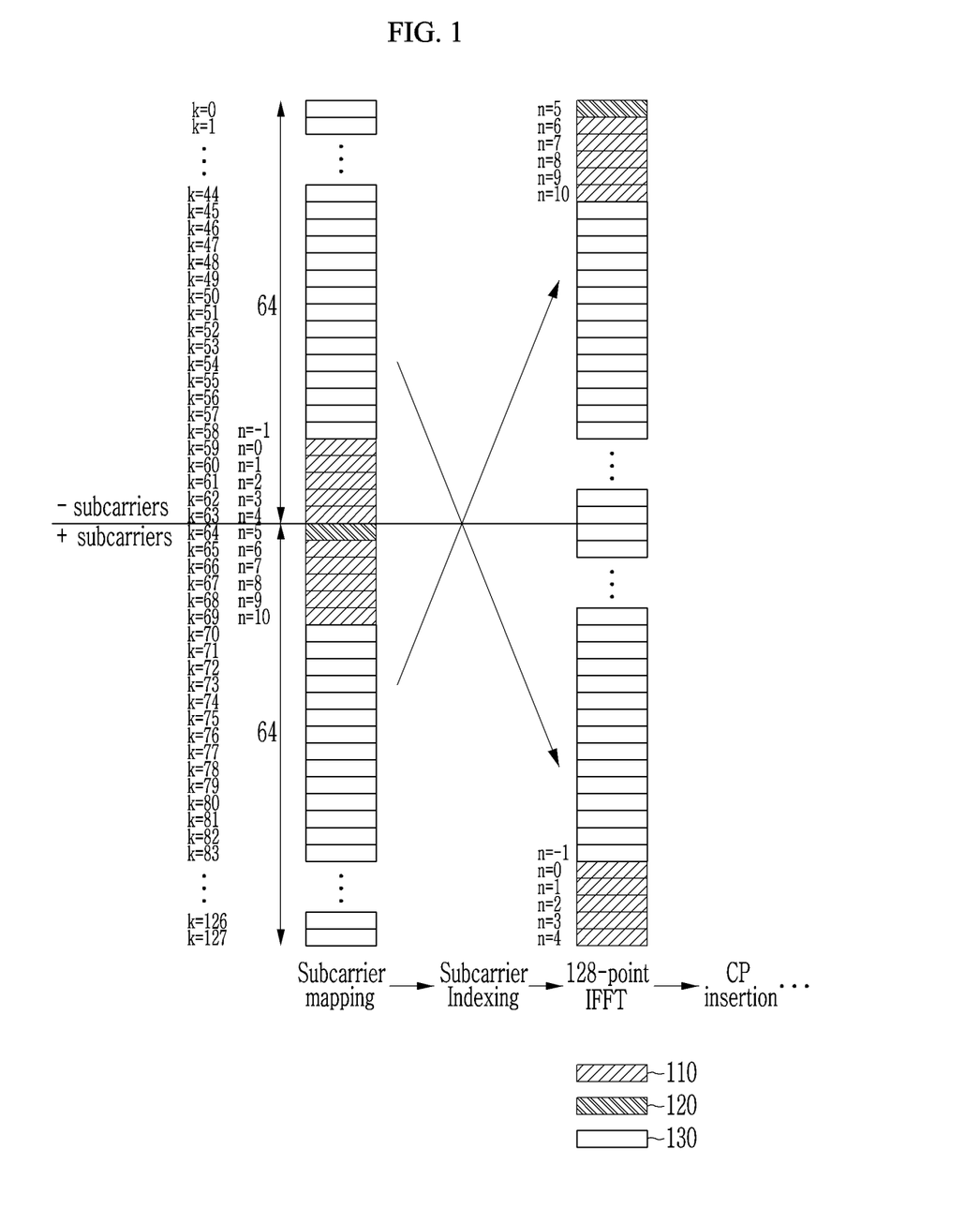
FIG. 1 is a view showing a method for generating a synchronization signal in a standalone operation mode according to an exemplary embodiment of the present invention.

FIG. 1 is a view showing a method for generating a synchronization signal in a standalone operation mode according to an exemplary embodiment of the present invention. In more detail, the method for generating a synchronization signal of FIG. 1 is a method for generating a time-domain synchronization signal including frequency-domain mapping in the case in which 128-point inverse fast Fourier transform (IFFT) is applied.

In FIG. 1, k indicates indices for the respective subcarriers, and n indicates subcarrier indices for the synchronization signal. In addition, subcarriers corresponding to the indices k from 0 to 63 mean a physically negative subcarrier group (− subcarriers), and subcarriers corresponding to the indices k from 64 to 127 mean a physically positive subcarrier group (+ subcarriers). Reference numeral 110 indicates subcarriers allocated to the synchronization signal of the Internet of things, reference numeral 120 indicates DC subcarriers, and reference numeral 130 indicates unused subcarriers.

When a transmitting apparatus allocates synchronization sequences of Equation 1 to positions 110 and 120 corresponding to the subcarrier indices n from −1 to 10 (that is, corresponding to 58≤k≤69), signals $c_l(k)$ (0≤k≤127) allocated to all the subcarriers may be obtained. In an exemplary embodiment of the present invention, such a process is called 'subcarrier mapping'.

Next, indexing is performed in order to allow subcarrier indices at the time of the IFFT and subcarrier indices of the physical meaning to coincide with each other. When the indexing is performed, $c_l(k)$ is changed in the frequency domain as represented by the following Equation 2. In an exemplary embodiment of the present invention, such a process is called 'subcarrier indexing'. That is, as shown in FIG. 1, after the subcarrier mapping is performed, the indexing is performed so that the subcarriers intersect with each other, which is called the subcarrier indexing.

$$\tilde{d}_l(k) = \begin{cases} c_l\left(k + \frac{128}{2}\right), & 0 \le k \le \frac{128}{2} - 1 \\ c_l\left(k - \frac{128}{2}\right), & \frac{128}{2} \le k \le 128 - 1 \end{cases}$$ (Equation 2)

When the transmitting apparatus performs 128-point IFFT on a frequency-domain signal on which the subcarrier indexing is performed as described above and inserts a cyclic prefix (CP) into the signal, a time-domain synchronization signal is generated.

Figure 2:
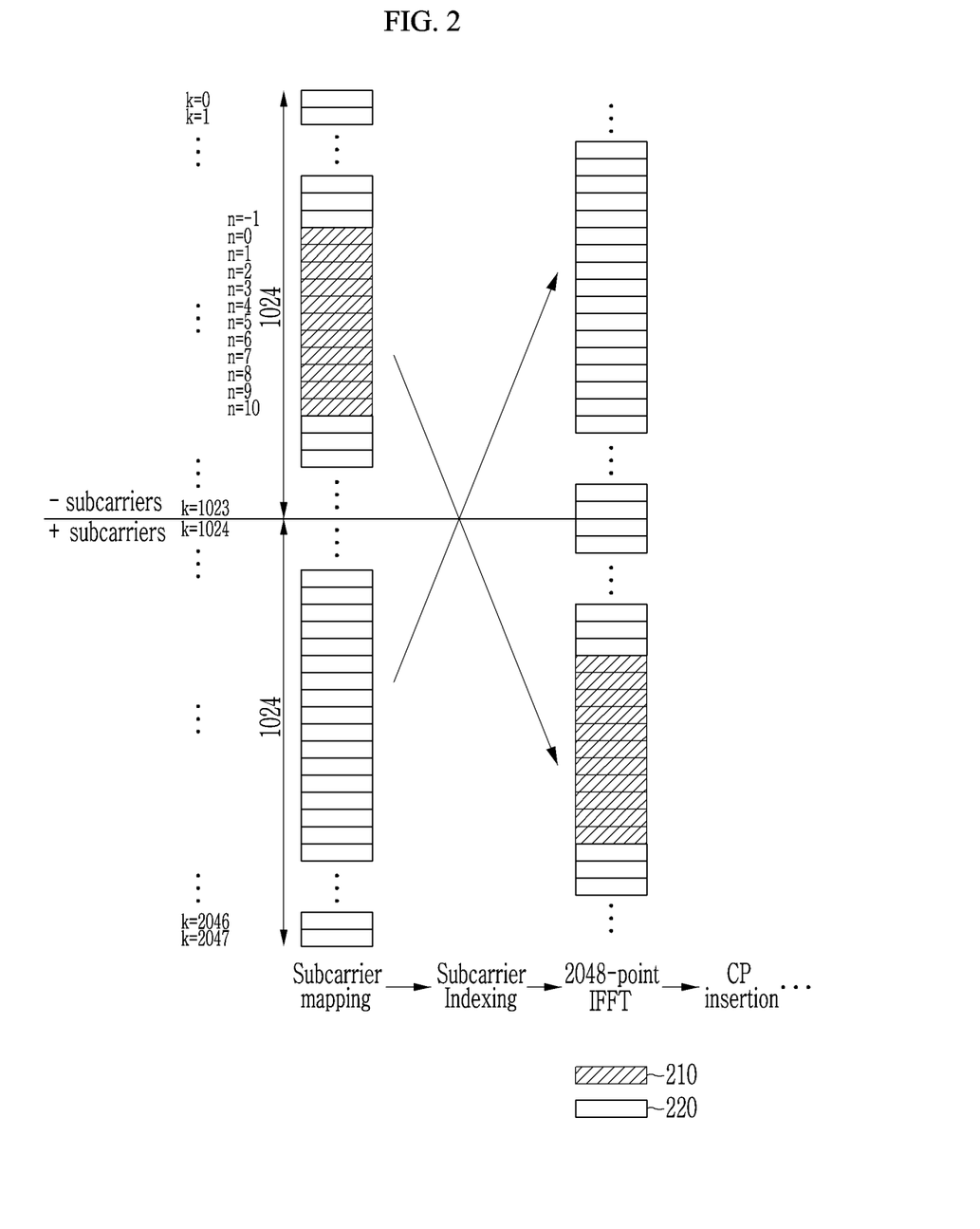
FIG. 2 is a view showing a method for generating a synchronization signal in an in-band operation mode according to an exemplary embodiment of the present invention.

FIG. 2 is a view showing a method for generating a synchronization signal in an in-band operation mode according to an exemplary embodiment of the present invention. In more detail, the method for generating a synchronization signal of FIG. 2 is a method for generating a time-domain synchronization signal including a frequency domain in a legacy long term evolution (LTE) system having a bandwidth of 20 MHz.

In FIG. 2, subcarriers corresponding to the indices k from 0 to 1023 mean a physically negative subcarrier group (− subcarriers), and subcarriers corresponding to the indices k from 1024 to 2047 mean a physically positive subcarrier group (+ subcarriers). In addition, reference numeral 210 indicates subcarriers allocated to a synchronization signal of the Internet of things, and reference numeral 220 indicates legacy LTE subcarriers.

When a transmitting apparatus allocates synchronization sequences of Equation 1 to positions 210 corresponding to the subcarrier indices n from −1 to 10, signals $c_l(k)$ (0≤k≤2047) allocated to all the subcarriers may be obtained.

Next, subcarrier indexing is performed in order to allow subcarrier indices at the time of the IFFT and subcarrier indices of the physical meaning to coincide with each other. When the subcarrier indexing is performed, $c_l(k)$ is changed in the frequency domain as represented by the following Equation 3.

$$\tilde{d}_l(k) = \begin{cases} c_l\left(k + \frac{2048}{2}\right), & 0 \le k \le \frac{2048}{2} - 1 \\ c_l\left(k - \frac{2048}{2}\right), & \frac{2048}{2} \le k \le 2048 - 1 \end{cases}$$ (Equation 3)

When the transmitting apparatus performs 2048-point IFFT on a frequency-domain signal on which the subcarrier indexing is performed as described above and inserts a CP into the signal, a time-domain synchronization signal is generated.

Meanwhile, a receiving apparatus of the Internet of things performs filtering on the time-domain signal in the in-band operating mode generated as shown in FIG. 2, and performs filtering on the time-domain signal in the standalone operation mode generated as shown in FIG. 1. However, since the time-domain signals filtered in each of the two modes do not have a correlationship therebetween, there is a problem that the receiving apparatus needs to store time-domain synchronization signals in separate memories in each mode. This causes an increase in a memory cost and power consumption of the receiving apparatus.

A method for solving such a problem will be described with reference to FIG. 3.

Figure 3:
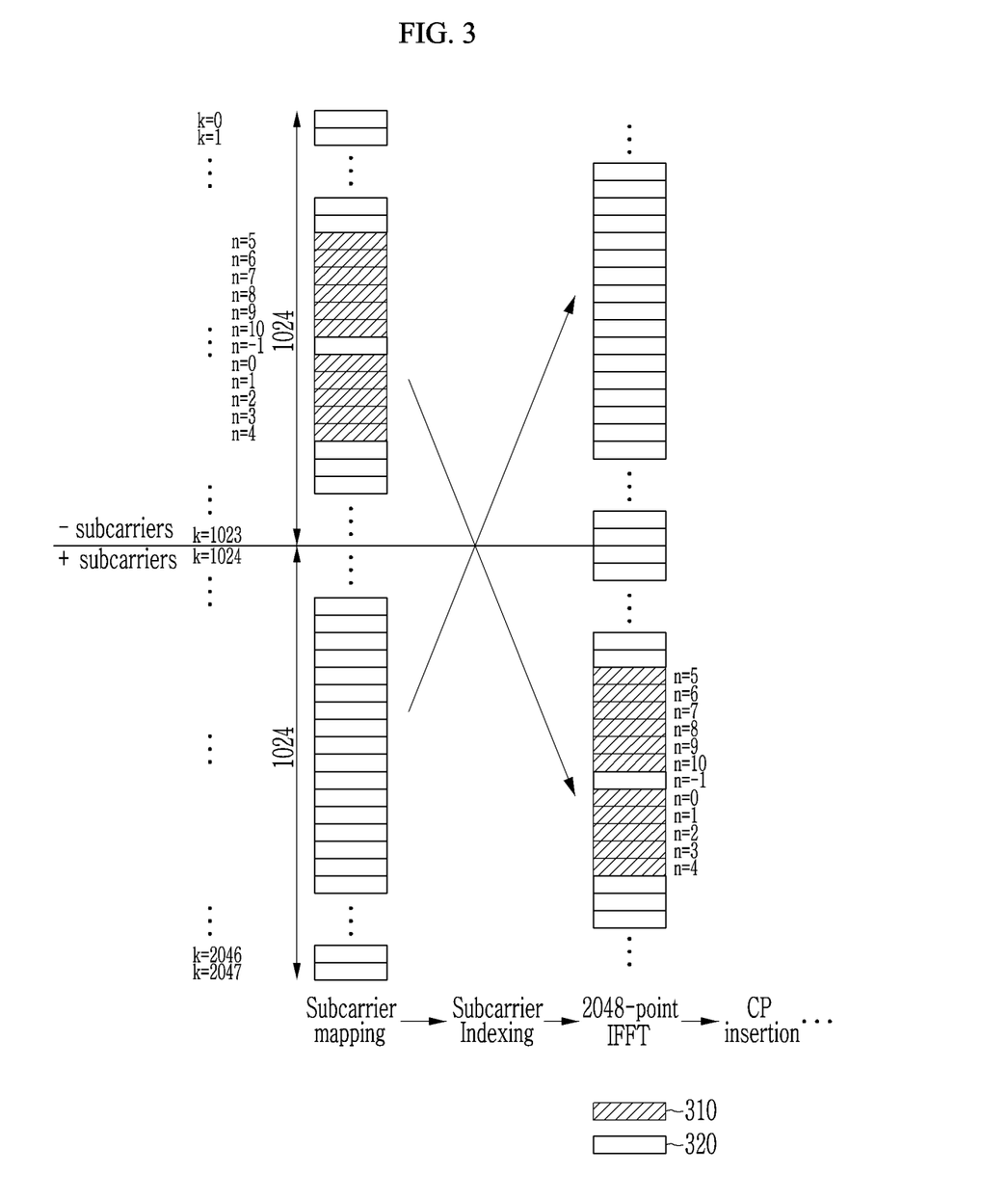
FIG. 3 is a view showing a method for generating a synchronization signal in an in-band operation mode according to another exemplary embodiment of the present invention.

FIG. 3 is a view showing a method for generating a synchronization signal in an in-band operation mode according to another exemplary embodiment of the present invention. In more detail, the method for generating a synchronization signal of FIG. 3 is a method for generating a time-domain synchronization signal including a frequency domain in an LTE system having a bandwidth of 20 MHz.

Since the method for generating a synchronization signal of FIG. 3 is the same as that of FIG. 2 except for a method for mapping subcarriers, an overlapped description will be omitted. In FIG. 3, subcarriers corresponding to the indices k from 0 to 1023 mean a physically negative subcarrier group (− subcarriers), and subcarriers corresponding to the indices k from 1024 to 2047 mean a physically positive subcarrier group (+ subcarriers). In addition, reference numeral 310 indicates subcarriers allocated to a synchronization signal of the Internet of things, and reference numeral 320 indicates legacy LTE subcarriers.

As shown in FIG. 3, the transmitting apparatus sequentially allocates $d_f(n)$ (5≤n≤10) of Equation 1 to positions corresponding to the subcarrier indices n from −1 to 4 of FIG. 2, and allocates $d_f(n)$ (−1≤n≤4), of Equation 1 to positions corresponding to the subcarrier indices n from 5 to 10 of FIG. 2. That is, subcarriers corresponding to the subcarrier indices n from 5 to 10 are first allocated, and subcarriers corresponding to the subcarrier indices n from −1 to 4 are allocated. In other words, in order to reduce complexity of the receiving apparatus, the transmitting apparatus performs subcarrier mapping by exchanging signals allocated to an upper subcarrier group (−1≤n≤4) and signals allocated to a lower subcarrier group (5≤n≤10) among all the synchronization signal subcarriers 310 allocated to the Internet of things with each other.

The transmitting apparatus performs the subcarrier mapping by exchanging the signals with each other as described above, and then performs subcarrier indexing. As shown in FIG. 3, a result performing the subcarrier indexing has a sequence of the lower subcarrier group (5≤n≤10) and the upper subcarrier group (−1≤n≤4). That is, referring to FIGS. 1 and 3, sequences of the subcarriers after the subcarrier indexing is performed are the same as each other between the standalone operation mode and the in-band operation mode.

Meanwhile, the receiving apparatus of the Internet of things performs filtering on the time-domain signal in the in-band operating mode generated as shown in FIG. 3, and performs filtering on the time-domain signal in the standalone operation mode generated as shown in FIG. 1. However, since the time-domain signals filtered in each of the two modes have a correlationship therebetween, the receiving apparatus may estimate synchronization signals using one memory regardless of modes. Therefore, an effect of reducing a memory cost and power consumption of the receiving apparatus may be achieved.

Although the method for generating a synchronization signal in the in-band operation mode has been described with reference to FIGS. 2 and 3, the contents described with reference to FIGS. 2 and 3 may be similarly applied to a guard band operation mode.

Figure 4:
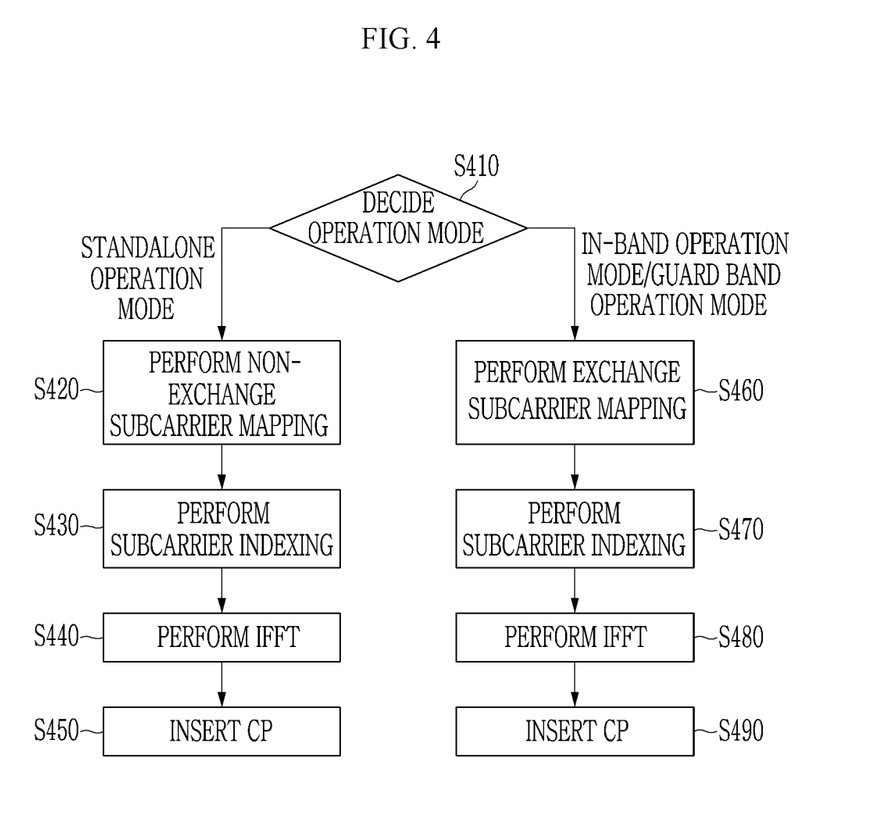
FIG. 4 is a flowchart showing a method for generating a synchronization signal by a transmitting apparatus according to an exemplary embodiment of the present invention.

FIG. 4 is a flowchart showing a method for generating a synchronization signal by a transmitting apparatus according to an exemplary embodiment of the present invention.

First, the transmitting apparatus decides an operation mode supported by a wireless communication system of the Internet of things (S410). That is, the transmitting apparatus decides whether the operation mode is the standalone operation mode or the in-band operation mode/the guard band operation mode. Since a method for deciding the operation mode may be recognized by a person of ordinary skill in the art to which the present invention pertains, a detailed description thereof will be omitted.

In the case in which the operation mode is the standalone operation mode in S410, the transmitting apparatus performs non-exchange subcarrier mapping (S420). That is, in the case in which the operation mode is the standalone operation mode, the transmitting apparatus performs subcarrier mapping by allocating the synchronization sequences of Equation 1 to the positions 110 and 120 corresponding to the subcarrier indices n from −1 to 10, as described with reference to FIG. 1. In other words, the transmitting apparatus performs subcarrier mapping without exchanging the signals allocated to the upper subcarrier group (−1≤n≤4) and the signals allocated to the lower subcarrier group (5≤n≤10) with each other in the standalone operation mode.

The transmitting apparatus performs subcarrier indexing (S430) after performing the non-exchange subcarrier mapping in S420. That is, the transmitting apparatus performs the subcarrier indexing by applying Equation 2 as described with reference to FIG. 1.

The transmitting apparatus performs the IFFT and inserts the CP to generate the time-domain synchronization signal in the standalone operation mode (S440 and S450), after S430.

Meanwhile, in the case in which the operation mode is the in-band operation mode or the guard band operation mode in S410, the transmitting apparatus performs exchange subcarrier mapping (S460). That is, in the case in which the operation mode is the in-band operation mode or the guard band operation mode, the transmitting apparatus allocates the subcarriers corresponding to the subcarrier indices n from 5 to 10 and then sequentially allocates the subcarriers corresponding to the subcarrier indices n from −1 to 4, as described with reference to FIG. 3. In other words, the transmitting apparatus performs subcarrier mapping by exchanging the signals allocated to the upper subcarrier group (−1≤n≤4) and the signals allocated to the lower subcarrier group (5≤n≤10) with each other in the in-band operation mode/the guard band operation mode.

The transmitting apparatus performs subcarrier indexing (S470) after performing the exchange subcarrier mapping in S460. That is, the transmitting apparatus performs the subcarrier indexing by applying Equation 2.

The transmitting apparatus performs the IFFT and inserts the CP to generate the time-domain synchronization signal in the in-band operation mode/the guard band operation mode (S480 and S490), after S460.

Figure 5:
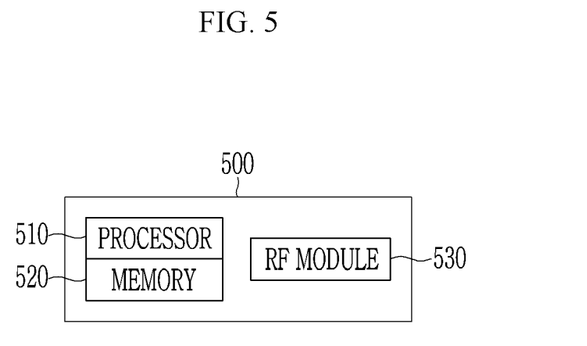
FIG. 5 is a view showing a transmitting apparatus according to an exemplary embodiment of the present invention.

FIG. 5 is a view showing a transmitting apparatus according to an exemplary embodiment of the present invention.

As shown in FIG. 5, the transmitting apparatus 500 according to an exemplary embodiment of the present invention includes a processor 510, a memory 520, and a radio frequency (RF) module 530.

The processor 510 is designed to implement the method for generating a synchronization signal described with reference to FIGS. 1 to 4.

The memory 520 is connected to the processor 510, and stores various kinds of Information related to operations of the processor 510 therein.

The RF module 530 is connected to an antenna (not shown), and transmits or receives wireless signals. In addition, the antenna may be implemented by a single antenna or a multi-antenna (a multi-input multi-output (MIMO) antenna).

Hereinafter, a method for solving a double-domain sequence mapping problem at the time of generating a synchronization signal will be described with reference to FIGS. 6 and 7.

Figure 6:
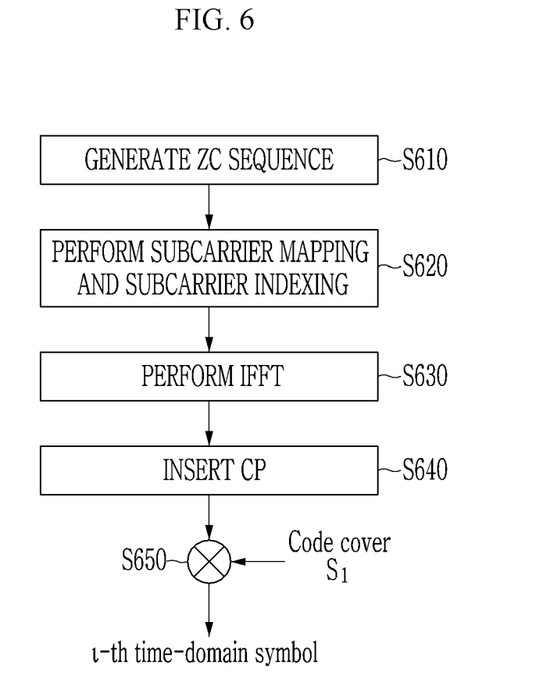
FIG. 6 is a view showing a method for generating a time-domain synchronization signal by double-domain sequence mapping in a standalone operation mode according to another exemplary embodiment of the present invention.

FIG. 6 is a view showing a method for generating a time-domain synchronization signal by double-domain sequence mapping in a standalone operation mode according to another exemplary embodiment of the present invention. Each process of FIG. 6 may be performed by the processor of FIG. 5.

First, the transmitting apparatus generates a length-11 ZC sequence corresponding to a root index of 5 as represented by Equation 1 (S610). In addition, the transmitting apparatus performs the subcarrier mapping and the subcarrier indexing described with reference to FIG. 1 (S620). The transmitting apparatus performs the IFFT and inserts the CP (S630 and S640). The transmitting apparatus performs code covering to generate the time-domain synchronization signal by the double-domain sequence mapping (S650), after S640. Here, $S_l$ means a code covering sequence maintained as the same ±1 value during one OFDM symbol section including the CP. Since the code covering sequence may be recognized by a person of ordinary skill in the art to which the present invention pertains, a detailed description thereof will be omitted.

Meanwhile, the in-band operation mode or the guard band operation mode may not have an independent frequency-domain processing process and time-domain processing process as shown in FIG. 6, and depends on a frequency-domain processing process and a time-domain processing process of a legacy LTE system. In order to perform the code covering in such a dependent condition, a method for generating a synchronization signal as shown in FIG. 6 may be used.

Figure 7:
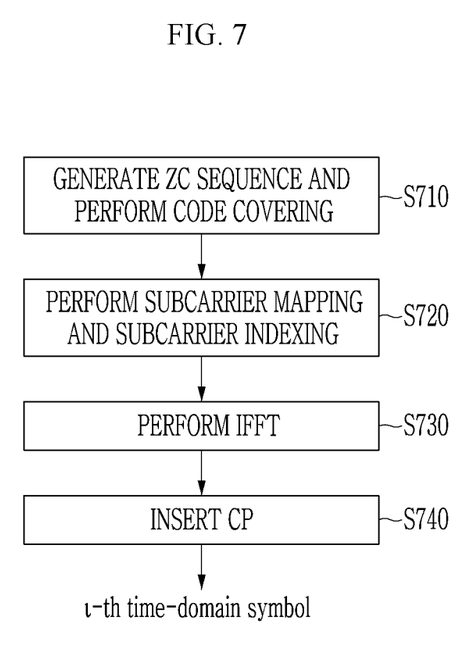
FIG. 7 is a view showing a method for generating a time-domain synchronization signal by double-domain sequence mapping in an in-band operation mode or a guard band operation mode according to another exemplary embodiment of the present invention.

FIG. 7 is a view showing a method for generating a time-domain synchronization signal by double-domain sequence mapping in an in-band operation mode or a guard band operation mode according to another exemplary embodiment of the present invention. Each process of FIG. 7 may be performed by the processor of FIG. 5.

First, the transmitting apparatus generates a length-11 ZC sequence corresponding to a root index of 5 as represented by Equation 1, and performs code covering on the ZC sequence (S710). A frequency-domain synchronization sequence code-covered on the ZC sequence is represented by Equation 4.

$$d_l(n) = S_l \exp\left(\frac{-j5\pi n(n+1)}{11}\right), n = 0, 1, \ldots, 10 \quad \text{(Equation 4)}$$

As represented by Equation 4, the frequency-domain synchronization sequence has a form in which Equation 1 is multiplied by the code covering sequence $S_l$.

In addition, the transmitting apparatus performs the subcarrier mapping (that is, the exchange subcarrier mapping) and the subcarrier indexing described with reference to FIG. 3 (S720). The transmitting apparatus performs the IFFT and inserts the CP (S730 and S740).

Meanwhile, although code covering in the frequency domain as shown in FIG. 7 is performed instead of code covering in the time domain as shown in FIG. 6 even in the case of the standalone operation mode, the same time-domain synchronization signal may be generated.

In addition, although the synchronization signal has been described by way of example in the exemplary embodiment of the present invention described above, the exemplary embodiment of the present invention may also be applied to a control signal or a data signal other than the synchronization signal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for generating a synchronization signal, in the Internet of things by a transmitting apparatus, comprising:

in an in-band operation mode or a guard band operation mode of the Internet of things,
dividing all subcarriers allocated for the synchronization signal into a first upper subcarrier group and a first lower subcarrier group; and
performing a first subcarrier mapping by exchanging a signal allocated to the first upper subcarrier group and a signal allocated to the first lower subcarrier group with each other, and in a standalone operation mode of the Internet of things,
dividing all subcarriers allocated for the synchronization signal into a second upper subcarrier group and a second lower subcarrier group; and
performing a second subcarrier mapping without exchanging the second upper subcarrier group and the second lower subcarrier group with each other.

2. The method of claim 1, further comprising:
performing subcarrier indexing on a signal on which the first subcarrier mapping is performed;
performing inverse fast Fourier transform (IFFT) on the signal on which the subcarrier indexing is performed; and
inserting a cyclic prefix (CP) into the signal on which the IFFT is performed.

3. The method, of claim 1, further comprising:
performing subcarrier indexing on a signal on which the second subcarrier mapping is performed;
performing IFFT on the signal on which the subcarrier indexing is performed; and
inserting a CP into the signal on which the IFFT is performed.

4. The method of claim 1, wherein the first upper subcarrier group is included in a physically negative subcarrier group, and the first lower subcarrier group is included in a physically positive subcarrier group.

5. The method of claim 1, wherein the second upper subcarrier group and the second lower subcarrier group are included in a physically negative subcarrier group.

6. The method of claim 1, wherein in the case in which a total number of all subcarriers is 12, indices for the first upper subcarrier group and the second upper subcarrier group are −1, 0, 1, 2, 3, and 4, respectively, and indices for the first lower subcarrier group and the second lower subcarrier group are 5, 6, 7, 8, 9, and 10, respectively.

7. The method of claim 1, further comprising deciding whether or not an operation mode for the Internet of things is the standalone operation mode or the in-band operation mode/the guard band operation mode.

8. A transmitting apparatus transmitting a synchronization signal in the Internet of things, comprising:
a processor performing a first subcarrier mapping by exchanging a first upper subcarrier group and, a first lower subcarrier group among all subcarriers allocated for the synchronization signal with each other to generate the synchronization signal, in an in-band operation mode or a guard band operation mode of the Internet of things; and
a radio frequency (RF) module transmitting the generated synchronization signal,
wherein the processor performs a second subcarrier mapping without exchanging a second upper subcarrier group and a second lower subcarrier group among all subcarriers allocated for the synchronization signal with each other to generate the synchronization signal, in a standalone operation mode of the Internet of things.

9. The transmitting apparatus of claim 8, wherein the processor performs subcarrier indexing on a signal on which the first subcarrier mapping is performed, performs inverse fast Fourier transform (IFFT) on the signal on which the subcarrier indexing is performed, and inserts a cyclic prefix (CP) into the signal on which the IFFT is performed.

10. The transmitting apparatus of claim 8, wherein the first upper subcarrier group is included in a physically negative subcarrier group, and the first lower subcarrier group is included in a physically positive subcarrier group.

11. The transmitting apparatus of claim 8, wherein the second upper subcarrier group and the second lower subcarrier group are included in a physically negative subcarrier group.

\* \* \* \* \*